United States Patent [19]
Schwartz et al.

[11] 3,760,046
[45] Sept. 18, 1973

[54] PROCESS FOR PRODUCING A COMPOSITE YARN WHICH IS BULKY, SLIP-RESISTANT AND OF HIGH STRENGTH

[75] Inventors: Harold A. Schwartz, Litchfield, Conn.; Morton I. Port, West End, N.J.

[73] Assignee: Avisun Corporation, Philadelphia, Pa.

[22] Filed: Aug. 4, 1967

[21] Appl. No.: 658,562

[52] U.S. Cl............ 264/47, 28/72 CS, 28/DIG. 6, 161/160, 161/175, 161/178, 161/180, 161/252, 264/48, 264/147, 264/162, 264/171, 264/290 R, 264/DIG. 16
[51] Int. Cl..................... B29d 7/20, B29d 27/00
[58] Field of Search................ 264/147, 162, 146, 264/171, 47, 45, 210 F, 48; 161/160, 178, 175, 180, 252

[56] References Cited
UNITED STATES PATENTS

| 3,557,265 | 1/1971 | Chisholm et al............. 264/47 |
|---|---|---|
| 3,398,220 | 8/1968 | Port et al..................... 264/147 |
| 3,594,459 | 7/1971 | Keuchel....................... 264/147 |
| 3,565,985 | 2/1971 | Schrenk et al................ 264/171 |
| 3,281,259 | 10/1966 | Lux et al....................... 264/48 |
| 2,728,950 | 1/1956 | Anniesser..................... 264/147 |
| 2,951,305 | 9/1960 | Seymour....................... 264/162 |
| 2,976,567 | 3/1961 | Jones et al.................... 264/146 |
| 3,189,941 | 8/1965 | Reifenhauser................. 18/13 |
| 3,415,920 | 12/1968 | Lee et al....................... 264/171 |

FOREIGN PATENTS OR APPLICATIONS

| 952,138 | 3/1964 | Great Britain................ 264/171 |
|---|---|---|
| 985,310 | 3/1965 | Great Britain................ 264/171 |

OTHER PUBLICATIONS

Press, J. J., Edt. "Man-Made Textile Encyclopedia," New York, Textile Book Publishers, Inc. A Div. of Interscience, c1959, pp. 890, 897, 900, 902, 903.

Linton, George E. "The Modern Textile Dictionary," Fully Revised and Expanded by George E. Linton. New York, Duell, Sloan and Pearce, c1963, pp. 364, 372, 756, 757, 917, 1066, 1067.

Billmeyer, Fred W. "Textbook of Polymer Science." New York, Interscience, c1962, pp. 363-373.

Primary Examiner—Philip E. Anderson
Attorney—Michael Ebert

[57] ABSTRACT

Composite polyolefin yarns formed by a polypropylene or high-density polyethylene core or center ply coated with at least one layer of a thermoplastic material such as a foamed resin, which serves to deluster and to reduce the slippage properties of the resultant yarn, and also to impart other characteristics thereto which improve the dye-ability and bondability of fabrics woven from the yarn, without sacrificing the advantages gained by the use of a high-strength core.

6 Claims, 5 Drawing Figures

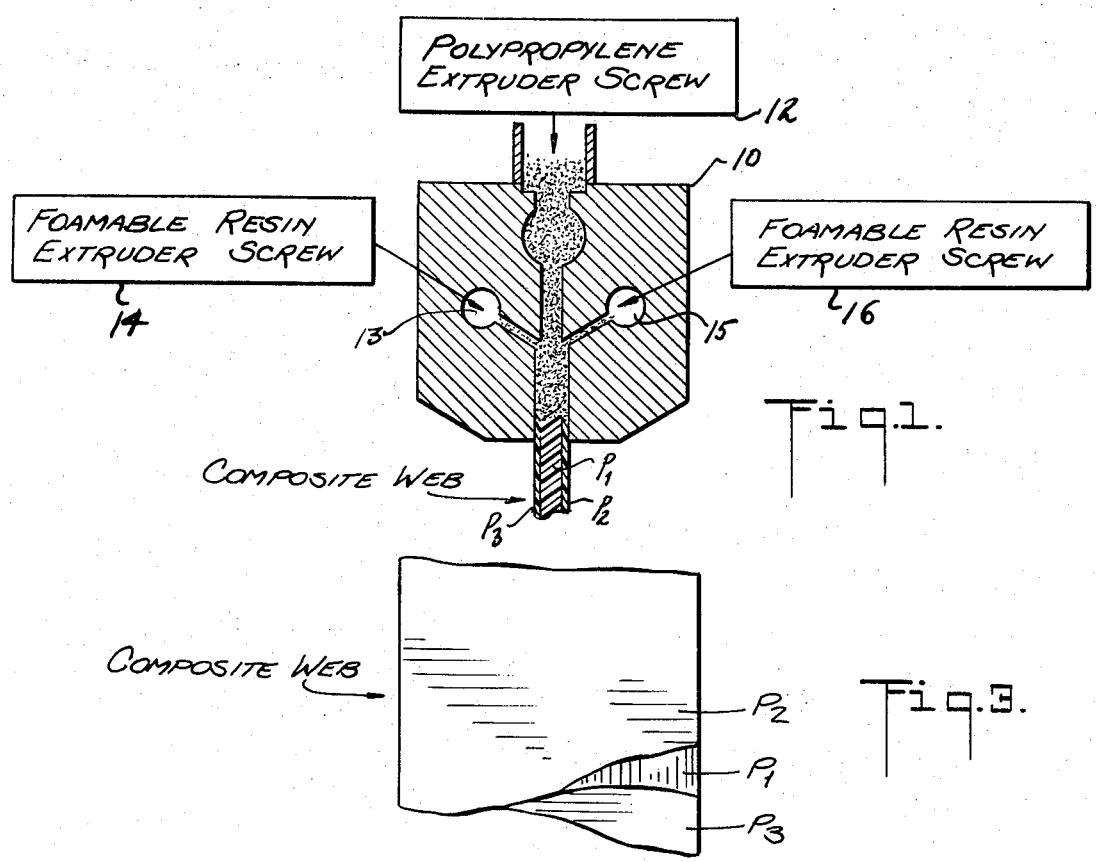
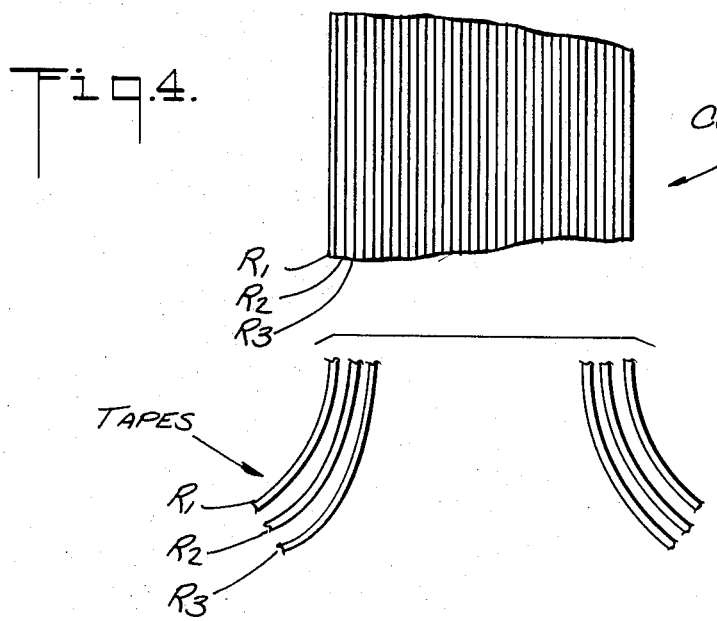

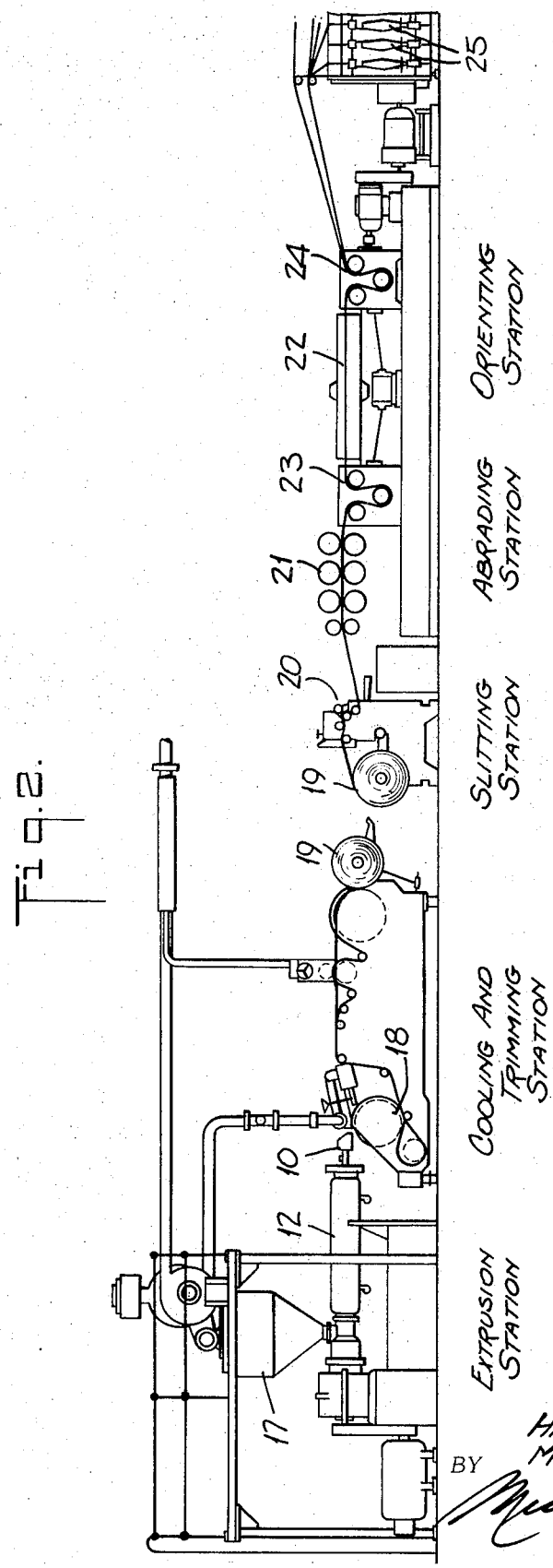

PROCESS FOR PRODUCING A COMPOSITE YARN WHICH IS BULKY, SLIP-RESISTANT AND OF HIGH STRENGTH

This invention relates generally to the production of yarns made primarily of high-strength polyolefin material, and more particularly to a composite yarn having a polypropylene or high-density polyethylene core or inner ply coated with an outer layer which delusters and increases the slip resistance of the yarn, as well as enhancing its bulk or sealability and imparting other desirable characteristics thereto.

Polypropylene yarns, such as those disclosed in Natta Pat. No. 3,112,300, possess exceptional properties, for they have a high strength-to-weight ratio and excellent resistance to many solvents and other common chemicals. Polypropylene fibers are relatively low in cost and immune to staining by cosmetics or foodstuffs. The resiliency of these fibers reduces any tendency to wrinkle or sag after extensive use.

While the low cost of polypropylene yarns coupled with their superior physical and chemical characteristics are responsible for the widespread use now being made of these yarns, such as in baling bags and covers, in backings for tufted rugs, and in industrial fabrics generally, the natural glossiness and smoothness of these yarns, which are enhanced by orientation, are in some respects a serious drawback. As a consequence, bags woven of flat polypropylene yarns are quite slippery, and when such bags are filled with grain or other material and are stacked one above the other, they can readily collapse on the warehouse floor.

One important use for polypropylene yarn is in sandbags, for such bags are far stronger than those made of natural yarns. However, in military applications, the high gloss of polypropylene is a distinct disadvantage, for such bags reflect light and call attention to target areas. Similarly, when a lustrous polypropylene yarn is used as a primary backing in a tufted rug, this leads to an inferior product, for when the pile or face yarns are of low density or are momentarily separated, the glossy surface of the primary backing becomes visible. Such "grinning" is regarded as commerically unattractive, for the primary backing should have a dull surface and is not intended to be exposed.

Moreover, the very qualities which make polypropylene yarns resistant to many chemicals, also make it difficult to print or dye fabrics woven of such yarns. Thus fabrics made of polypropylene are also impossible to print by standard techniques, for they have a low affinity for standard printing inks. Though it is possible to process polypropylene fabrics so that the surface thereof will be more receptive to printing inks and dyes, such processing is costly and also, to a degree, degrades the product.

Similarly, polypropylene fabrics are not receptive to standard adhesive systems. This is a drawback in tufted rugs, wherein pile yarns are needled into a polypropylene backing. In such rugs, it is the usual practice to anchor the underlying pile loops to the backing by latex or other adhesives and to laminate a secondary backing or scrim thereto. When the primary backing is fabricated of polypropylene, ordinary adhesives do not bond effectively thereto.

Polypropylene yarns being a thermoplastic material, can be sintered together or sealed by heat and pressure or by ultrasonic heating techniques. However, the application of heat tends to impair the molecular orientation of polypropylene and thereby to diminish the strength of this material. If, therefore, cut edges of woven polypropylene material are fused together to prevent fraying, this operation will also weaken the material where heat is applied thereto.

The production of crystalline polypropylene is an outgrowth of catalytic techniques previously developed for the low-pressure polymerization of ethylene, the two materials being in the polyolefin family. Commercial polyethylenes are classified as low-density, medium-density, and high-density, the strength and chemical resistance increasing with density. Low-density polyethylene is often referred to as conventional polyethylene, for it was the first ethylene polymer produced. High-density polyethylene has characteristics similar to those of polypropylene, for while it is of high strength and low weight, it is both slippery and glossy. Hence it suffers from the same disabilities mentioned previously in connection with polypropylene.

The basic difference between polypropylene and high-density polyethylene, is that the latter is not as heat-resistant as the former. However, it can be handled in a manner similar to polypropylene in respect to extrusion, stretching and winding. For many industrial applications, the high-density polyethylene can be used with equal satisfaction and the choice as between polyethylene and polypropylene becomes largely a matter of relative cost at the time of application. The term "polyolefin material" as used hereinafter encompasses polypropylene, high-density polyethylene, and other polyolefin materials having high-strength structural characteristics similar thereto.

Accordingly, it is the main object of this invention to produce a composite yarn formed primarily of a polyolefin material in the form of a polypropylene or high-density polyethylene core, which core is coated by a foamed resin or other material which acts to deluster and to reduce the slippage properties of the yarn, to impart texture and greater bulk thereto, and otherwise to alter the surface properties of the yarn without, however, sacrificing the basic high-strength, low-weight and low-cost advantages gained by the use of polyolefin material.

More specifically, it is an object of the invention to provide a technique for extruding multiple layers of plastic material, one of which is a high-strength polyolefin, to form a composite film which subsequently can be oriented and formed into yarn.

A significant advantage of the invention is that the polyolefin serves as a high-strength, low-weight core whereas the outer layers, which preferably are formed of a foamed material, while relatively weak, impart bulk to the composite and afford other characteristics which obviate the drawbacks inherent in the polypropylene or high-density polyethylene core.

Briefly stated, these objects are accomplished by the use of a multi-chambered extrusion die which enables the production of two or more film layers, separate extruder screws being operatively coupled into the individual entry ports on the die, one extruder screw supplying a molten polyolefin, and the others, molten plastics having the desired surface characteristics. In the extrusion die, the molten materials combine in a common orifice before leaving the die body to produce a composite film which is then quenched and slit into individual ribbons or tapes, the tapes being stretched and heated to effect molecular orientation thereof.

Preferably, the outer layers on the polyolefin core are foamed resins which are of the same resinous material as the core or of a different material. Because foamed resins have a somewhat irregular surface, they provide a non-slippery composite yarn. This composite also lends itself to delustering, for by abrading the foamed resin surface, the pores of the foam are exposed and the gloss of the material is substantially reduced. Alternatively, the outer layer may be a low-melt material to facilitate sintering without affecting the orientation of the core, or a material having a better affinity for adhesives and dyes than the core material.

For a better understanding of the invention, as well as other objects and further features thereof, reference is made to the following detailed description to be read in conjunction with the accompanying drawing, wherein:

FIG. 1 is a schematic view of a multi-chambered die for producing a composite film material;

FIG. 2 shows a system incorporating said multi-chambered die, for producing a composite yarn in accordance with the invention;

FIG. 3 is a plan view of the composite web produced at one stage in the system;

FIG. 4 is a plan view of the slit composite web produced at another stage in the system; and FIG. 5 is a plan view of the separated tapes produced at another stage in the system.

EXTRUSION OF THE COMPOSITE MATERIAL

Extrusion is the term applied to the process of shaping a plastic material by forcing it through a die orifice. In a conventional extruder, the raw plastic material, usually in granular form, is fed from a hopper through the feed throat into the channel of a screw rotating in a lined barrel. Heat is applied to the barrel from external heaters. As the granules are conveyed along the screw channel, they are melted, the melt being forced through a breaker plate which in some cases supports a screen pack. The melt then flows through an adapter into a die.

In the present invention, the extruder is adapted to produce a composite flat film or web, the base layer of which is formed of polyolefin material which is either of polypropylene or high-density polyethylene. The surface layers of the composite film are formed by a thermoplastic material imparting to the surface of the composite yarn produced by the system, desirable properties not possessed by the polyolefin core. In the example now to be discussed, the web to be produced will have a high-strength polypropylene core coated on either side with a thin layer of foamed polyethylene of low density, or of foamed polypropylene.

It is to be understood, however, that in practice many other coating materials may be used, and that instead of layers on both sides of the polypropylene core, a layer on only one side may be used. For example, the surface layer may be a foamed polyvinyl resin which acts not only to increase the coefficient of friction of the composite yarn, but also to augment the bulk thereof, so that fabric woven of this composite yarn will have high slip resistance as well as good hand. Because the yarn having foamed resin surfaces is somewhat compressible, a fabric woven thereof with a low thread count has a more closed-up surface, thereby providing greater coverage than ordinary yarns.

The choice of a material for the outer layers of the composite yarn must take into account the affinity of these layers for the core material. Hence the surface layer may be any foamed material having an affinity for the high-strength polyolefin core and capable of integrating with the core.

Referring now to FIG. 1, to produce a composite web of plastic material having an inner core or ply of polypropylene, there is provided a multi-chamber die, generally designated by numeral 10, having three entrance ports which admit molten material into passages conveying the material to a common die orifice where the extruded layers of material combine and interbond to form a composite web.

The die is of the type generally used for extruding unsupported flat film. Desirable flow paths may be achieved through the use of a tear-drop shaped feed manifold which slopes downwardly from the entry port toward the die lips at the orifice thereof. This provides a path of decreasing resistance to flow across the die from the feed port to the orifice which compensates for the additional length of travel and equalizes the rate of exit from the die lips. Control of flow rate and film thickness may be accomplished by adjustment of the lip opening and by means of zoned temperature control. Internal surfaces are preferably highly polished and chrome-plated.

Fed into an entry port leading to the main manifold 11 in the die is molten polypropylene from an extruder screw 12; fed into the entry port leading to an auxiliary manifold 13 is molten polyethylene containing foam-inducing agents from an extruder screw 14; and fed into the entry port leading to another auxiliary manifold 15 is molten polyethylene containing foam-inducing agents from an extruder screw 16. It is to be understood that in lieu of a multi-chambered die having a common orifice, two or more distinct dies may be used in conjunction with a corresponding number of screws, the die orifices being aligned one above the other to produce superposed layers of plastic material which combine while still hot and soft at the output to produce a composite web.

The reason foamed polyethylene of low density is used in combination with polypropylene is that it affords a higher coefficient of friction and decreases the slippage of the composite yarn. Still another advantage is that it affords a relatively low-melt coating, so that the composite yarn may be subjected to heat and pressure sufficient to cause the polyethylene coating to fuse without affecting the orientation of the polypropylene. The invention is not limited to foamed polyethylene, and is usable also with other thermoplastic polymers which include a gas-producing foaming agent causing pores to form in the layer which increase the bulk thereof.

Thus emerging from the orifice of the die is a composite warm web, as shown in FIG. 3, having an inner layer of ply $P_1$ of polypropylene, and outer layers $P_2$ and $P_3$ of foamed polyethylene of low density. Polypropylene is a low-cost material, and when the outer layer is of more expensive material, the over-all cost of the yarn is not greatly increased, for the amount of material used in the outer layer or layers is relatively small per pound.

Alternatively, the composite web may be produced by blown-film extrusion using a die having concentric rings for introducing the various molten plastics into a common orifice from which the materials are extruded in tubular form. The tabular extrusion is composed of concentric layers and is expanded into a bubble which is thereafter flattened to form a composite web.

TAPE-PRODUCING SYSTEM

Referring now to FIG. 2, there is shown a system in accordance with the invention for producing a composite tape or flat yarn having a polyolefin core and face layers imparting the desired surface properties to the yarn or tape. In the drawing, the multiple-chamber die 10 is shown fed by an extruder screw 12 with molten polypropylene, the heated screw being supplied with granules of the raw material through a hopper 17. Also fed into the multi-chamber die through separate extruders (14 and 16 in FIG. 1) is the molten foam resin, these extruders not being shown in FIG. 3.

Polyethylene is a crystalline resin and produces the toughest extrudate when quickly cooled. Rapid quenching prevents the development of large crystals which tend to embrittle the material. Polypropylene material is cooled and handled in much the same manner as polyethylene. Since polypropylene is even more crystalline, rapid quenching becomes of the utmost importance.

The composite film emerging from die 10 may be quickly cooled either by chill-rolls or by an air blast, or quenched in a water bath. In FIG. 2, chill-rolls 18 are used for cooling. When water quench cooling is used, the die is brought as close to the water surface as possible. After the composite web has been cooled, the edges are trimmed by an air knife or other means, and the web is wound on steel tubes into reels 19 with straight edges. The thickness of the polypropylene core in the web may be in the order of one or two mils, whereas the foamed resin layer is relatively thin (i.e., 0.10 mil or less) unless a bulky yarn is desired.

The reel 19 from the cooling and trimming station is then transferred to a slitting station wherein the broad web is unwound and conveyed through a bank of circular slitting knives 20 on a common shaft or other slitting means. This web, as shown in FIG. 3, which is composed of a core ply $P_1$ and face plies $P_2$ and $P_3$, is cut into parallel tapes or ribbons $R_1$, $R_2$, $R_3$, etc., as shown in FIG. 4. In practice, the web may be cut into thirty or more tapes, the number depending, of course, on the yarn size desired. Standard yarn sizes running from 50 to 200 mils may be produced, as well as other sizes.

In order to deluster the yarn, the slit web is then conveyed through a series of rotating grinding wheels 21 having a sandpaper or other abrasive surface. This grinding action acts to expose the pores in the foamed resin layers $P_2$ and $P_3$ and provides a relatively rough surface which not only increases the coefficient of friction to reduce slippage, but also acts to remove all gloss from the surface.

The parallel tapes $R_1$, $R_2$, $R_3$, etc., emerging from the abrading station then pass through an orientation station provided with a heating zone 22 and input and output godet rollers 23 and 24, whereby the tapes are heated and stretched to an extent producing molecular monoaxial orientation which greatly improves the tensile strength of the tapes. It is known that molecular orientation can be imparted to various organic synthetic polymers of high molecular weight by stretching. This is best done while heating the material to a temperature close to its melting point. While the abrading has been disclosed as taking place before orientation is effected, in practice it may be carried out after orientation or prior to slitting.

Finally, the stretch-oriented tapes $R_1$, $R_2$, $R_3$, whose surfaces have been abraded, are separated, as shown in FIG. 5, and are fed to a take-up machine where each tape is wound into a package on individual bobbins 25. In practice, the take-up machine may be supplied with a collective winder wherein all the tapes are wound into a warp beam which serves as a semi-product for subsequent machines.

If desired, the systems may be made continuous, with the composite web from the cooling and trimming station being fed directly into the slitting station, in which event the speed of extrusion must be coordinated with all subsequent processing steps in the system.

APPLICATIONS

The composite flat yarns in accordance with the invention, are constituted by a core of polyolefin material having face layers with the desired surface properties. First we shall consider the applications for a flat yarn of polypropylene or high-density polyethylene with an abraded foam resin layer of the same or a different material. This layer is devoid of luster and has a high coefficient of friction.

In the field of tufted carpets, a composite yarn of the type described is of particular advantage both as a primary backing into which the pile yarns are tufted, and as a secondary backing laminated to the primary backing to impart greater body to the tufted carpet. The lack of luster is an advantage in the primary backing in that a shiny material "grins" through to the surface of the carpet, particularly in carpets where there are a low number of stitches per inch. Moreover, the foamed-resin or abraded face layers have a greater attraction for adhesives which are used to laminate the secondary backing to the primary backing. At the same time, the basic high strength to low weight ratio characteristic of the polyolefin core is retained, so that the carpets are strong and dimensionally stable. Because of the improved adhesion effected in the primary and secondary backings, fraying of tufted fabrics, resulting from cutting and trimming operations, is minimized.

Also in the field of tufted fabrics, one may use a composite yarn for the backing having dyeable surface layers, such as acrylic or nylon. By giving these surface layers the same color as the pile yarns tufted into the backing, the effects of grinning are minimized, for the exposure of the backing is not apparent. The use of a dyeable coating on the yarns is also of advantage in piece-dyeing operations, for then the pile yarns and the backing may be given the same tint in a dye bath.

In the field of decorative fabrics, the foamed surface on a material woven of the three-ply yarn, lends itself easily to being embossed with a heated roll, thereby making it possible to produce decorative patterns on the fabric. Also, while the core material is difficult to dye, the foamed surfaces have a greater affinity for dye material, so that it becomes possible to color the fabric or to print thereon.

In the case of sand-bags or industrial bags, the roughened surface prevents slipping, and in the case of sand-bags for military purposes, the delustered surface provides security against detection. Thus the basic strength of the polyolefin core is retained without the attendant drawbacks.

In making fabrics with low thread counts, the use of ordinary polyolefin yarns for this purpose is not possible, for the yarns in the weave tend to slip with respect to each other, and it is not possible to maintain the form of the product. However, by sintering the yarns at their points of intersection, the weave pattern may be maintained, even with a very open-mesh configuration. However, if ordinary polyolefin yarns are sintered, this will impair their orientation, thus weakening the fabric. But with the use of yarns in accordance with the invention having outer layers with a low-melt characteristic, such as ethylene vinyl acetate, low-density polyethylene, or low molecular weight polypropylene, which melts at a lower temperature than the core material, one may apply heat and pressure to effect sintering without adversely affecting the orientation of the core material.

It is known to weave bags completely in a loom without the need for subsequent sewing to form seams. In a bag of this type, one cannot safely sinter all points of intersection, for the bag walls may then block together and become unusable. However, by using composite yarns in accordance with the invention, and introducing these yarns only at the points of strain, the bag otherwise being woven with conventional yarns, it then becomes possible to make a satisfactory loom-woven bag. These points are along the side or bottom seams.

While there have been shown and described a preferred embodiment of composite polyolefin yarn and process for producing the same in accordance with the invention, it will be appreciated that many changes and modifications may be made therein without, however, departing from the essential spirit of the invention as defined in the annexed claims.

What we claim is:

1. A process for producing a composite yarn which is bulky, slip-resistant and of high strength, said process comprising the steps of:
    a. extruding a molten high-density unfoamed polyolefin to form a core web thereof,
    b. simultaneously extruding two molten polymers having surface characteristics which differ from the polyolefin core to produce a pair of relatively thin face webs, said polymers being constituted by foamed low-density polyolefin material having internal pores therein,
    c. joining said webs to form a composite web,
    d. slitting said composite web into parallel tapes of yarn size,
    e. stretch-orienting said tapes to produce composite tapes whose tensile strength and weight are determined primarily by the core material and whose bulk and surface characteristics are determined by the face material, and
    f. abrading said tapes to expose the pores in the foamed material and to impart a roughened, non-glossy surface thereto, thereby enhancing the coefficient of friction.

2. A process as set forth in claim 1, wherein said abrasion is effected before the tapes are stretch-oriented.

3. A process as set forth in claim 1, wherein the steps thereof are carried out continuously.

4. The process as set forth in claim 1, wherein said polyolefin core is a polypropylene.

5. The process as set forth in claim 1, wherein said polyolefin core is a high-density polyethylene.

6. The process as set forth in claim 1, wherein said molten materials are extruded in a multi-chambered die having a flat orifice common to said materials.

* * * * *

PO-1050
(5/69)

UNITED STATES PATENT OFFICE
CERTIFICATE OF CORRECTION

Patent No. 3,760,046      Dated September 18, 1973

Inventor(s) Schwartz, Harold A.
Port, Morton I.

It is certified that error appears in the above-identified patent and that said Letters Patent are hereby corrected as shown below:

Column 1, line 48: "also" should be --almost--

Column 5, line 2: "tabular" should be --tubular--

Signed and sealed this 5th day of March 1974.

(SEAL)
Attest:

EDWARD M. FLETCHER, JR.       C. MARSHALL DANN
Attesting Officer      Commissioner of Patents